Figure 1:
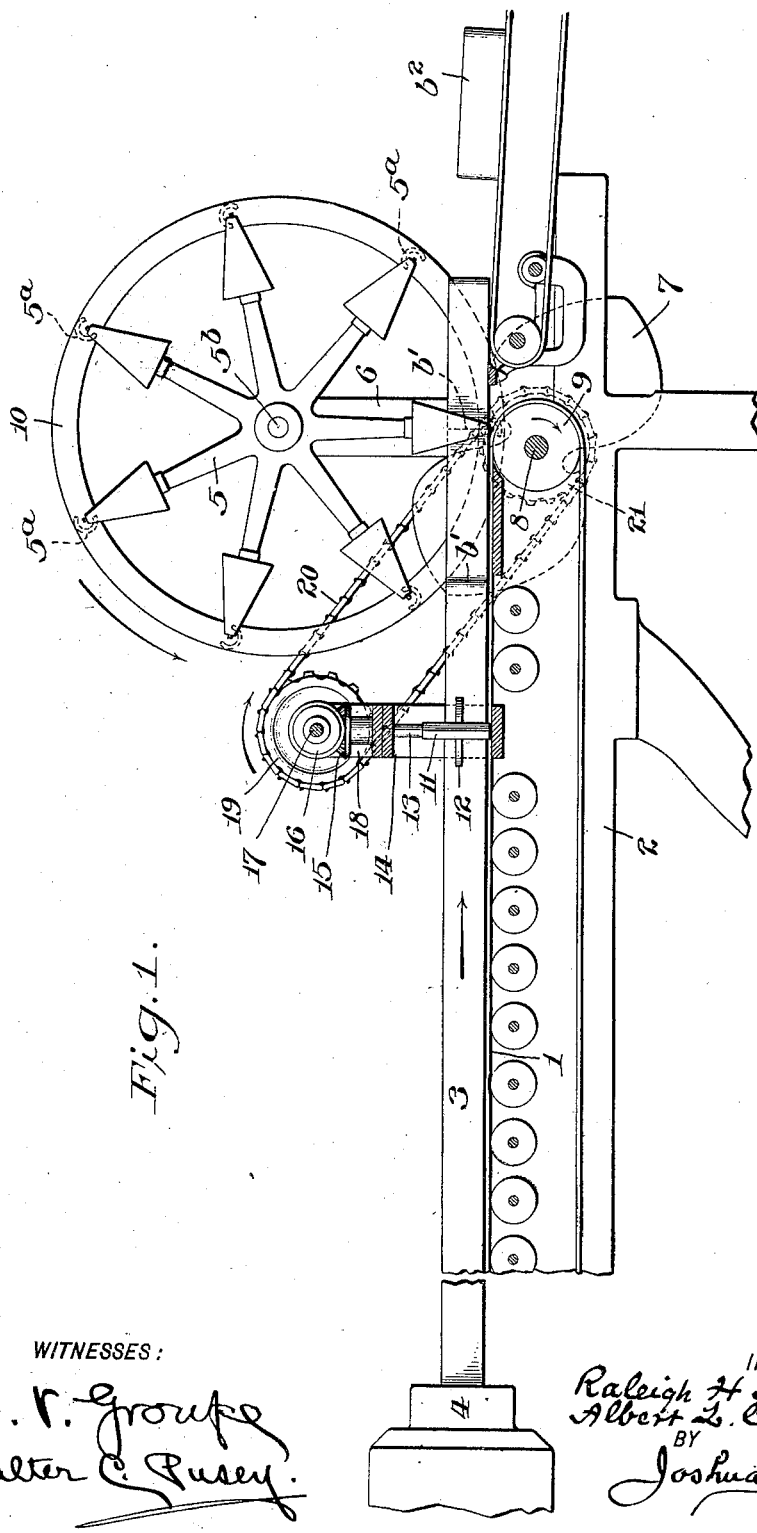

No. 663,689. Patented Dec. 11, 1900.
R. H. STALEY & A. L. CONVERSE.
DEVICE FOR INDENTING AND SEVERING BARS OF CLAY, &c.
(Application filed Feb. 23, 1900.)
(No Model.) 2 Sheets—Sheet 1.

WITNESSES:
A. V. Groupe
Walter C. Pusey.

INVENTORS
Raleigh H Staley
Albert L. Converse,
BY
Joshua Pusey
ATTORNEY

No. 663,689. Patented Dec. 11, 1900.
R. H. STALEY & A. L. CONVERSE.
DEVICE FOR INDENTING AND SEVERING BARS OF CLAY, &c.
(Application filed Feb. 23, 1900.)
(No Model.) 2 Sheets—Sheet 2.
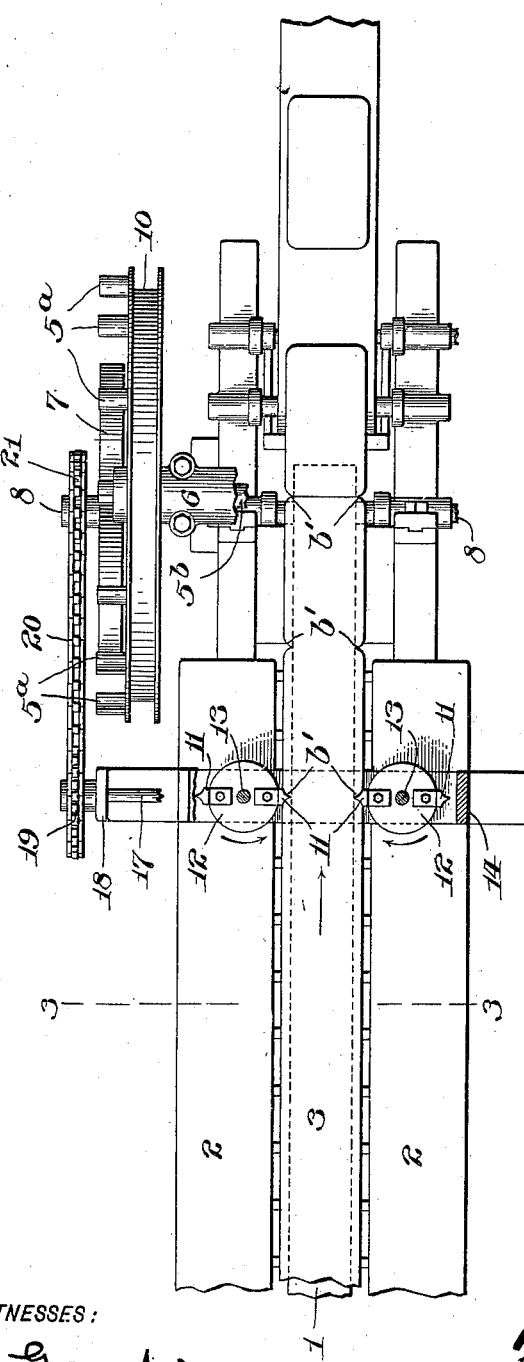
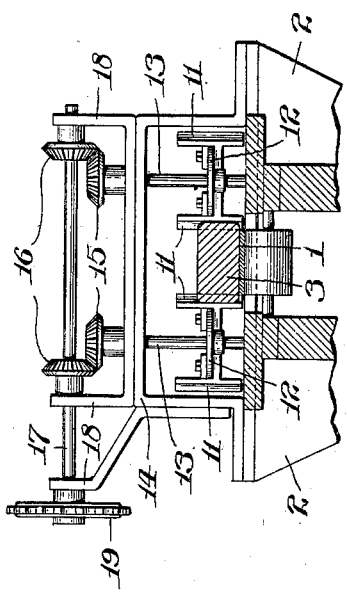
WITNESSES: INVENTORS
Raleigh H. Staley,
Albert L. Converse,
BY
Joshua Pusey,
ATTORNEY

UNITED STATES PATENT OFFICE.

RALEIGH H. STALEY AND ALBERT LUTTES CONVERSE, OF SPRINGFIELD, ILLINOIS; SAID CONVERSE ASSIGNOR TO SAID STALEY.

DEVICE FOR INDENTING AND SEVERING BARS OF CLAY, &c.

SPECIFICATION forming part of Letters Patent No. 663,689, dated December 11, 1900.

Application filed February 23, 1900. Serial No. 6,315. (No model.)

*To all whom it may concern:*

Be it known that we, RALEIGH H. STALEY and ALBERT LUTTES CONVERSE, citizens of the United States, residing at Springfield, in the county of Sangamon, State of Illinois, have invented certain new and useful Improvements in Devices for Indenting and Severing Bars of Clay, &c., of which the following is a full, clear, and exact description, reference being had to the accompanying drawings, of which—

Figure 1, Sheet 1, is a side elevation, partially in section. Fig. 2, Sheet 2, is a plan view of Fig. 1, certain parts being broken away. Fig. 3 is a section as on line 3 3, Fig. 2, with the cut-off mechanism omitted.

The object of this invention is to provide an organized machine or mechanism for producing expeditiously and with uniformity, from a continuous bar of clay, bricks with rounded corners, adapted more especially for use in street-paving.

To this end the invention, broadly considered, comprises cut-off mechanism or devices for severing the moving bar of clay, in combination with mechanism or devices adapted to make indentations in the side of the bar at suitable intervals, which mechanisms are so connected and correlated that the line of severance of the clay bar by the cut-off mechanism shall be coincident with the line of the indentations made by the indenting mechanism.

The invention consists, further, in certain novel devices and combinations hereinafter particularly described, and pointed out in certain claims.

Referring to the accompanying drawings, forming a part of this specification, 1 is an endless belt, hereinafter termed the "regulating-belt," running over end pulleys and intervening rollers journaled in a suitable frame 2, which belt is adapted to receive a bar of clay 3, expressed from the die 4, Fig. 1, of a brick-machine. The mechanism for severing the bar of clay into brick lengths consists in the present instance of a revoluble cut-off wheel 5, journaled in suitable supports 6 above the said belt, having mounted transversely thereon a series of cut-off wires (not shown) that are adapted to pass successively through the bar of clay 3 as the wheel rotates, the rotation of the latter being regulated by the movement of the belt 1, which latter is regulated by the movement of the bar of clay thereon. The course or movement of the said wheel is controlled so as to cause the cut-off wires to pass squarely through the moving clay bar, at right angles thereto, by means of a cam 7 on the shaft 8 of the forward pulley 9, around which the belt 1 passes, the said wheel having tappets $5^a$, adapted to impinge upon the edge of the cam 7. This cut-off wheel is aided to move in unison with the clay bar by means of a friction or slipping belt (not shown) running over a wheel 10 on the shaft $5^b$ of the cut-off wheel and over a positively-driven pulley, (not shown,) whereby whatever be the speed of movement of the bar of clay the cut-off wires will be caused to pass squarely through at right angles to the bar. The circumference of the pulley 9, hereinafter termed the "measuring-pulley," (as it determines the length of the bricks to be made,) plus one-half of the thickness of the regulating-belt, is made equal to a multiple of such brick length. In the present instance it is equal to two brick lengths. We do not deem it necessary to further describe this cut-off mechanism, which has been in extensive use for many years and is the invention of Cyrus Chambers, Jr., and is fully described in Letters Patent of the United States No. 362,204, issued to him May 3, 1887. We have merely taken the said mechanism by way of illustration, as any other suitable cut-off mechanism may be used and combined and correlated with the indenting mechanism.

Referring now to the indenting mechanism, 11 denotes vertical bars, hereinafter termed "indenters." These are fixed to a disk 12, that is mounted on a vertical shaft 13. The projecting or outer ends of these indenters are pointed or of V form, as shown, and in the present instance there are two equidistant indenters and two sets thereof on opposite sides of the path of the bar of clay, as seen in Figs. 2 and 3, which are adapted to pass into and out of said path as their respective shafts rotate in unison, as hereinafter explained. The said shafts 13 are journaled in a suitable frame 14, that is supported by and upon the frame 2, which sustains the endless belt 1. On the upper end of each of said shafts is a bevel-gear 15, with which engages a similar gear 16 on a horizontal shaft 17, that is journaled in uprights 18 of the frame 14. On the free end of the latter shaft is a sprocket-wheel 19, around which passes a sprocket-chain 20, that also passes around a similar wheel 21 on the end of the shaft 8 of the measuring-pulley 9 of the endless belt 1. As the speed of rotation of the shaft 8, and consequently that of the cut-off which is governed by the cam 7 on said shaft, corresponds with the surface speed of travel of the bar of clay, and the sprocket-wheels 19 and 21 being of the same size and the bevel-gears 15 and 16 being of the same size, the speed of rotation of the indenters 11 will correspond with the advance movement of the bar of clay and of the cut-off wheel, and the relative timing of the movement of the clay bar, the cut-off mechanism, and the indenting devices is such that the severance of the clay bar shall always be on the line of the indentations previously made by the operation of the indenters.

In the machine shown in the drawings the indenting devices are located at such distance in advance of the cut-off devices that the indentations are made in the bar of clay a distance of two brick lengths from the point of complete severance thereof. The distance between the indenters and the cut-off is, however, immaterial, so long as the devices are properly relatively timed that the severance shall be on the line of the indentations, as hereinbefore alluded to. In practice we would prefer to locate the indenting devices at such distance in advance of the cut-off that the indentations would be made in the clay bar at a time when the cut-off wires are not passing through the bar of clay—that is, during the interval between the successive cuts—thus relieving the bar of the double strain that would be imposed upon it were the indentations and cutting to take place simultaneously. There being two of the indenters to each set, whose distance apart in the arc of a circle struck from the center of shaft 13 and connecting the outer or cutting edge of the indenters is equal to a brick length, two successive indentations in each side of the bar, a brick length apart, will be made at each complete revolution of the shafts 13, that respectively carry the indenters.

While it is preferred to make two indentations at each complete revolution of the indenter-shafts, it is obvious that by suitably changing the connections between the latter and the shaft 8 of the measuring-pulley 9, with a corresponding change in the arrangement of the indenters, (or a single one may be used,) there may be a greater or less number of indentations at each revolution of the indenter-shafts.

It will be seen that as the cut-off is transversely across from the bottoms of the indentations $b'$ the end corners or edges of the bricks will be rounded or beveled, as the case may be, as seen by observing the brick $b^2$ in Figs. 1 and 2 that has been cut off. If it also be desired, as is usually the case with street-paving bricks, the longitudinal corners of the bricks may be likewise rounded or beveled, as seen in Fig. 3, by having the corners of the die 4 of suitable shape.

As hereinbefore suggested, we do not limit ourselves to the precise cut-off mechanism described, nor is our invention limited to the particular indenting devices and mechanism, nor to the particular mechanism shown for supporting and conveying the bar of clay, the essence of the invention being in what may be termed an "organization" consisting of suitable supporting and conveying devices for the bar of clay, suitable indenting devices, and suitable cut-off devices and connections between said devices, all combined, arranged, and correlated that the movements of the bar of clay, of the indenting devices, and the cut-off devices shall be in unison to effect the result which is the ultimate object of the invention hereinbefore described.

Having thus described our invention, we claim as new and desire to secure by Letters Patent—

1. In combination, means for supporting and conveying a bar of clay, suitable indenting mechanism, a suitable cut-off mechanism, said means and mechanisms being relatively arranged and correlated substantially as shown and described, and connections between the same to cause them to work in unison, whereby the said indenting mechanism is caused to make indentations in the bar of clay at predetermined intervals apart, and the cut-off mechanism is caused to sever said bar transversely to the direction of movement thereof on a line coincident with said indentations, substantially as set forth.

2. In combination, an endless belt or carrier adapted to receive thereon a moving bar of clay, cut-off mechanism connected with said carrier adapted to sever the bar of clay transversely into brick lengths, mechanism adapted to form transverse indentations in said bar, and located with relation to said carrier and cut-off mechanism as described, and connections between said carrier and mechanisms adapted to cause the same to work in unison to sever the said bar transversely to the direction of movement thereof on the line of the indentations previously made by the indenting mechanism, substantially as and for the purpose set forth.

3. In combination, an endless belt or carrier adapted to receive a moving bar of clay thereon, cut-off mechanism connected with said carrier adapted to sever the bar of clay transversely into brick lengths, an indenting device consisting of one or more moving bars of suitable form located in advance of said cut-off mechanism and arranged relatively to said carrier and a bar of clay thereon, as shown and described, and connections between said carrier and cut-off mechanism and said indenting device adapted to cause the latter device to rotate in unison with the cut-off mechanism, whereby indentations are made in the moving bar of clay at predetermined intervals, and the said bar is severed transversely on the line of said indentations previously made, substantially as set forth.

In testimony whereof we have hereunto affixed our signatures this 13th day of February, A. D. 1900.

RALEIGH H. STALEY.
ALBERT LUTTES CONVERSE.

Witnesses:
WM. T. SMITH,
HIRAM E. GARDNER.